United States Patent
Neumann

(10) Patent No.: US 7,823,477 B2
(45) Date of Patent: Nov. 2, 2010

(54) SETTING DEVICE JOINT WITH A ROTATING WOBBLER

(75) Inventor: Karl-Erik Neumann, Alvsjo (SE)

(73) Assignee: PKM Tricept S.L., Saragossa (ES)

( * ) Notice: Subject to any disclaimer, the term of this patent is extended or adjusted under 35 U.S.C. 154(b) by 0 days.

(21) Appl. No.: 10/573,515

(22) PCT Filed: Oct. 1, 2004

(86) PCT No.: PCT/EP2004/011002

§ 371 (c)(1), (2), (4) Date: Mar. 27, 2006

(87) PCT Pub. No.: WO2005/036000

PCT Pub. Date: Apr. 21, 2005

(65) Prior Publication Data

US 2007/0137476 A1    Jun. 21, 2007

(30) Foreign Application Priority Data

Oct. 2, 2003   (SE) ................................ 200302610

(51) Int. Cl.
   *B25J 17/00* (2006.01)
(52) U.S. Cl. ..................... 74/490.05; 403/57
(58) Field of Classification Search ............. 74/490.01, 74/490.05, 490.06; 403/131, 53, 57, 160, 403/122; 414/901
   See application file for complete search history.

(56) References Cited

U.S. PATENT DOCUMENTS

| | | | | |
|---|---|---|---|---|
| 4,732,525 A | * | 3/1988 | Neumann | 414/729 |
| 4,785,528 A | * | 11/1988 | Soderberg | 414/729 |
| 4,852,418 A | * | 8/1989 | Armstrong | 74/60 |
| 5,486,174 A | * | 1/1996 | Fournet-Fayard et al. | 403/122 |
| 5,823,906 A | * | 10/1998 | Ashburn et al. | 475/164 |
| 5,865,063 A | * | 2/1999 | Sheldon | 74/490.01 |
| 5,964,664 A | * | 10/1999 | Cook et al. | 464/117 |
| 5,987,726 A | * | 11/1999 | Akeel | 74/490.06 |
| 6,014,909 A | * | 1/2000 | Fiora | 74/490.06 |
| 6,035,733 A | * | 3/2000 | Yoshizawa | 74/45 |
| 6,099,217 A | | 8/2000 | Wiegand et al. | |
| 6,658,962 B1 | * | 12/2003 | Rosheim | 74/490.05 |
| 6,719,506 B2 | * | 4/2004 | Chang et al. | 409/201 |
| 6,729,202 B2 | * | 5/2004 | Gosselin et al. | 74/490.05 |
| 2003/0121351 A1 | * | 7/2003 | Gosselin et al. | 74/490.05 |

FOREIGN PATENT DOCUMENTS

| | | |
|---|---|---|
| DE | 3400679 A1 | 7/1985 |
| DE | 19904702 A1 | 8/2000 |
| GB | 252499 A | 6/1926 |

* cited by examiner

*Primary Examiner*—Michael P Ferguson
(74) *Attorney, Agent, or Firm*—McDonnell Boehnen Hulbert & Berghoff, LLP

(57) ABSTRACT

A joint (17) for connecting to a parallel-kinematic machine (1) a setting device (5) mounted in said machine, wherein the setting device (5) is intended to move a machine-connected positioning head (16) in space, and wherein the setting device (5) is mounted around a wobbler (30, 106) for rotation about a wobbler axis (50), and wherein the wobbler (30, 106) is, in turn, mounted for rotation around a main axis (20) which extends through the bearing means of the setting device (5) around the wobbler (30, 106).

8 Claims, 3 Drawing Sheets

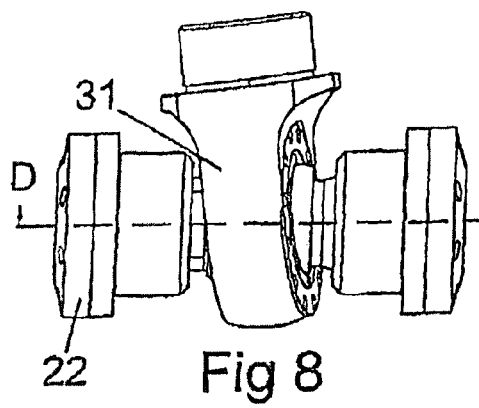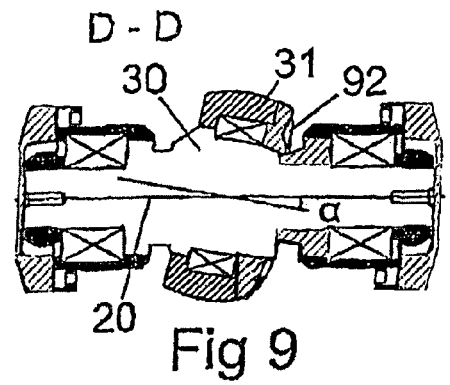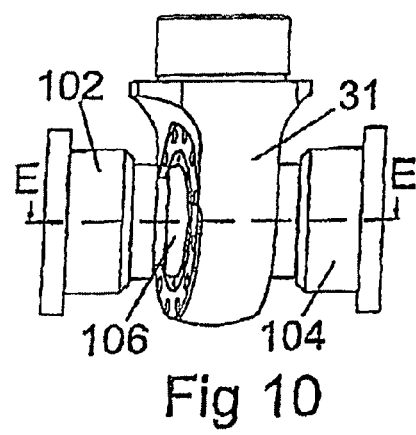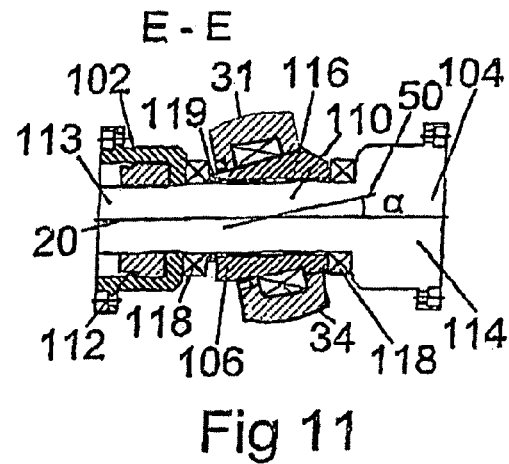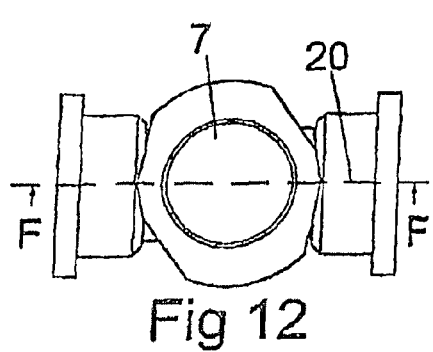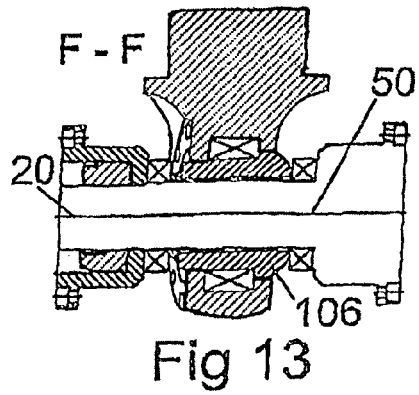

SETTING DEVICE JOINT WITH A ROTATING WOBBLER

FIELD OF INVENTION

The present invention relates to parallel-kinematical machines, for example tripods and hexapods, and then particularly to the joints that connect the setting devices of such machines to the machines themselves.

BACKGROUND OF THE INVENTION

Respective setting devices of a parallel-kinematical machines are comprised, for instance, of a piston which is movable axially in a cylinder and which is fastened at one end to a positioning head via a first joint and to a frame structure via a second joint both of said joints having the form of universal joints. See for instance SE 452 279 and its corresponding European Patent specification 0202206. These joints require two degrees of freedom with respect to movement of the positioning head. Because the setting device is normally in the form of a screw-nut mechanism, there is also obtained a third degree of freedom in the form of a rotary movement of a setting device component. It is necessary to eliminate this degree of freedom, in order to achieve axial displacement. Earlier known joints and their setting device mounts have the form of spherical ball joints which have three degrees of freedom, comprising two angular movements and a rotational movement, wherein one degree of freedom (the rotational movement generated by the setting device) is locked either in the joint itself or in the setting device.

Another known joint has the form of a cardan universal joint which although having only two degrees of freedom (two angular movements) is too large and complicated to provide sufficient rigidity.

The drawback with these earlier known joints resides in insufficient rigidity in the joint and in the joint mounts, or in the complication of the joint construction, wherewith both of these factors result in impaired tolerances with respect to movement of the positioning head.

Another drawback with known joints is that they tend to become excessively large when given sufficient rigidity, a factor which has a limiting effect on the mobility of the positioning head.

OBJECT OF THE INVENTION

The object of the present invention is to provide a solution to these problems and to provide a setting device joint of the aforesaid kind that has a sufficient number of degrees of freedom for movement of the positioning head in a construction that is highly rigid and that, at the same time, is stinting with respect to space.

A third object is to utilise a third degree of freedom that derives from rotation in the setting device as a joint function, instead of eliminating this degree of freedom through the construction of the joint.

Another object of the invention is to provide a joint which allows high tolerances in respect of movement of the positioning head.

Yet another object of the invention is to provide such a joint that is simple and cost effective from a production/technical aspect.

SUMMARY OF THE INVENTION

These objects are fulfilled by the present invention, as defined in the independent claim. Convenient embodiments of the invention will be apparent form the accompanying dependent claims.

A setting device is, for instance, designed as a screw-nut mechanism, where either the screw or the nut is designated as a piston that is able to move axially within a cylinder. In this regard, the invention relates to a joint between the setting device and a positioning head and/or frame in a parallel-kinematical machine. One end of the piston is mounted rotatably about a so-called wobbler which is pivotal about a wobbler axis extending therethrough. In turn, the wobbler is mounted for rotation relative to the positioning head and/or the frame about a main axis, wherein the two axes mutually intersect at a fixed angle $\alpha$, where $1° \leq \alpha \leq 45°$ and where $\alpha$ is preferably $5° \leq \alpha \leq 20°$. The angle thus means that the wobbler axis will wobble about the axle as the wobbler rotates about said main axis.

According to a first embodiment, the wobbler has the form of a supporting shaft which rotates about said main axis and which has two ends that are each rotatably mounted in a respective bearing housing fixedly connected to the positioning head and/or the frame. In this case, the wobbler is comprised of the supporting shaft. By way of an alternative to the first embodiment, the wobbler has the form of a part which is firmly fitted to said supporting shaft, but detachable therefrom.

According to a second embodiment, the wobbler is rotatably mounted on a supporting shaft which is clamped firmly to the positioning head and/or to the frame.

The wobbler also includes an external bearing mounting surface or an external bearing surface around which the setting device is mounted.

Furthermore, when the setting device is mounted to the positioning head and/or to the frame, the fixed angle $\alpha$ is orientated in relation to the supporting shaft such as to allow tilting between the setting device and the supporting shaft in response to rotation of the wobbler around the main axis.

Thus, rotation about said main axis occurs either when the supporting shaft, to which the wobbler is firmly connected, rotates or when the wobbler rotates on the supporting shaft.

A further result achieved by means of the present invention is that the relatively large rotary movement of the wobbler that takes place as the setting device tilts in the joint causes effective lubricant transportation.

Although the joint is primarily aimed at movably connecting the setting device to the positioning head, the joint may also constitute a second setting device joint, by providing a movable connection between the setting device and the machine frame or stand, as earlier mentioned.

BRIEF DESCRIPTION OF THE DRAWINGS

The present invention will now be described in more detail with reference to exemplifying embodiments thereof and also with reference to the accompanying drawings, in which

FIG. 8 is a side view of the joint according to FIG. 6, i.e. with the joint at an angle of 90° around the main axis;

FIG. 9 is a sectional view of the main axis taken on the line D-D in FIG. 8;

FIG. 10 is a side view of a corresponding joint according to a second embodiment of the invention, i.e. the joint is shown at an angle of 90° degrees around the main axis.

FIG. 11 is a sectional view of the main axis taken on the line E-E in FIG. 10;

FIG. 12 illustrates from above the joint according to FIG. 10 in a starting position at an angle of 0° about the main axis; and FIG. 13 is a sectional view of the main axis taken on the line F-F in FIG. 12.

DESCRIPTION OF THE INVENTION

Figure 1:
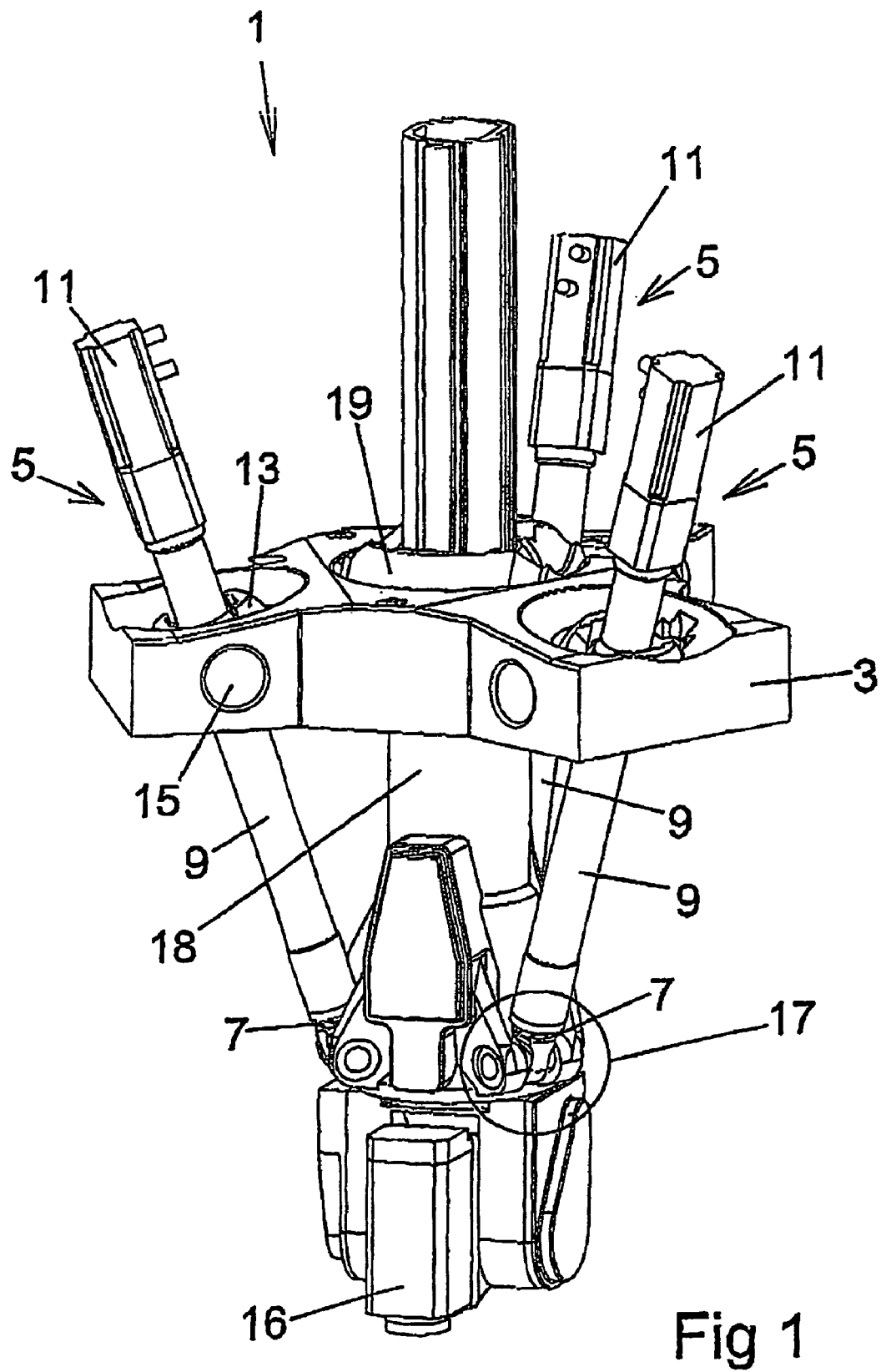
FIG. 1 illustrates a parallel-kinematic machine in the form of a tripod that includes a joint according to a first embodiment of the invention.

FIG. 1 illustrates a parallel-kinematic machine 1 in the form of a tripod which includes a frame 3 that supports three setting devices 5, each in the form of a piston 7 which is displaced in a cylinder 9. The piston is displaced in the cylinder with the aid of conventional drive means, such as mechanical, hydraulic or pneumatic motors. The illustrated setting devices are mechanical devices in the form of screw and nut mechanisms each driven by an electric motor 11 connected to one end of its respective setting device. Each cylinder 9 is connected to the frame 3 via a frame joint 13 which enables the setting device 5 and its associated cylinder 9 to swing in all directions relative to the frame 3. The frame joint illustrated in FIG. 1 has the form of a cardan universal joint with the pivot pins 15 of the outer ring mounted in the frame 3. It will be understood that other types movable bearings can be used to mount the setting devices movably to the frame.

One end of the piston 7 that is displaceable axially in the cylinder 9 of the setting device 5 is connected to a positioning head 16 via an arm joint 17, which is shown encircled in the figure. Furthermore, the positioning head 16 is connected to the end of an arm which is mounted on the frame 3 via a universal joint 19 which includes an outer ring that is mounted on the frame 3 through the medium of two pivot pins, and an inner ring which is mounted in the outer ring through the medium of two shaft journals. The arm 18 extends from the positioning head 16 symmetrically between the setting devices 5 and through the universal joint 19. The setting devices 5 are disposed along the side edges of an imaginary triangular pyramid and the positioning head 16 can be brought precisely to a desired position in space, by displacing the pistons 7 in respective cylinders 9. In this respect, the arm 18 can be displaced axially in relation to the frame 3 and the universal joint 19.

Figure 2:
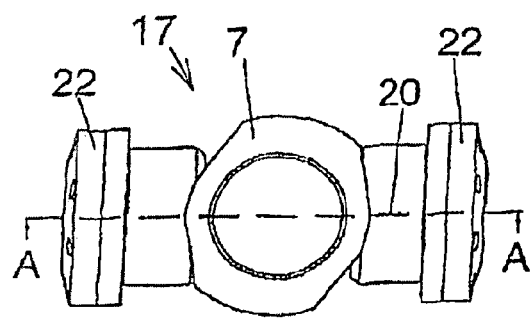
FIG. 2 taken from above and along the setting device of solely the joint according FIG. 1, and shows the joint in a starting position at an angle of 0° around a main axis.

FIGS. 2-9 illustrate a first embodiment of the joint 17 wherein FIG. 2 is a view from above of solely the joint 17 as seen in the direction of the piston 7 of the setting device in a starting position at an angle 0° about a main axis 20 and angular rotation of the piston 7 about the longitudinal axis of the piston. The joint 17 is securely mounted to the positioning head via joint mounting means 22 on respective sides of the joint.

Figure 3:
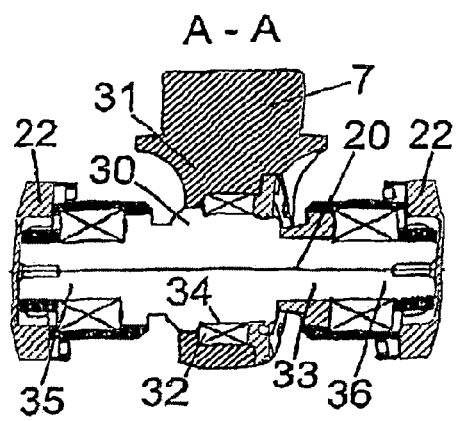
FIG. 3 is a sectional view of the main axis, taken on the line A-A in FIG. 2.

The sectional view A-A in FIG. 3 shows that one end 31 of the piston 7 of the setting device is mounted about a wobbler 30 which is formed as a unitary part of a supporting shaft 33 of the joint. Both ends 35, 36 of the supporting shaft 33, and therewith also the wobbler 30, are, in turn, mounted in the joint mounting means 22 for rotation about the main axis 20. In the illustrated sectioned view, the axis of the wobbler 30 coincides with the main axis 20. The end 31 of the piston 7 is fitted to a bearing mounting surface 34 via a wobbler bearing 32. Alternatively, the bearing mounting surface 34 may consist of a surface machined directly in the wobbler 30, wherewith said bearing surface forms a part of the wobbler bearing. As an alternative to the wobbler 30 forming a unitary part of the supporting shaft 33, the wobbler and the supporting shaft may have the form of mutually separate parts which can be joined together releasably to form a unit upon assembly.

Figure 4:
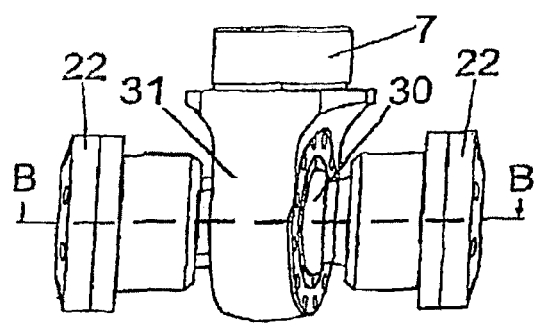
FIG. 4 is a side view of the joint according to FIG. 2, i.e. shows the joint at an angle of 90° around the main axis.

FIG. 4 is a side view of the joint shown in FIG. 2 and clearly shows angular rotation of the piston 7 about it longitudinal axis and its mounting about the wobbler 30. Thus, the figure shows an angular position of the piston end 31 subsequent to having been rotated through 90° around the main axis in relation to the FIG. 2 illustration, while the wobbler 30 remains in the same position relative to the joint mounting means 32.

Figure 5:
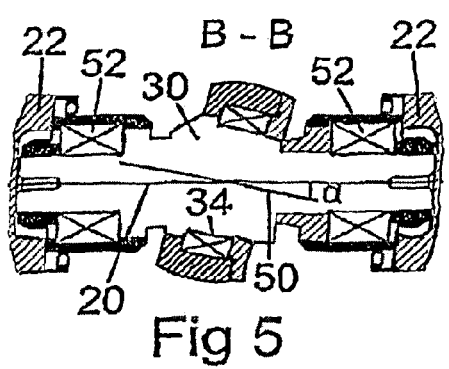
FIG. 5 is a sectional view of the main axis, taken on the line B-B in FIG. 4

FIG. 5 is a sectioned view taken on the line B-B in FIG. 4. As will be seen from FIG. 5, the symmetry line of the bearing mounting surface 34 of the wobbler 30 defines a wobble axis 50 which defines a constant angle α with the main axis 20. However, the angle may have different values depending on the sections illustrated. Moreover, the wobbler 30 is mounted for rotation in relation to the joint mounting means 22 via pivot journals 52 for rotation about the main axis 20. Because the bearing mounting surface 34 is orientated at a constant angle in relation to the main axis, the bearing mounting surface 34, and therewith the wobble axis 50, will execute a wobbling movement in response to contemplated rotation of the wobbler 30 about the main axis 20.

Figure 6:
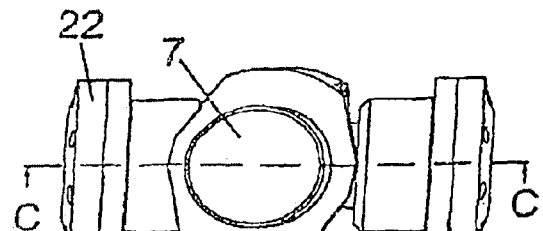
FIG. 6 is a view taken from above in accordance with FIG. 2, but showing the setting device tilted at an angle of 7° in relation of the main axis.

FIG. 6 illustrates the same state as that shown in FIG. 2, although with the difference that the piston 7 has been allowed to tilt through an angle of 7° in a direction towards one of the joint mounting means 22. This tilting movement is a result of bringing the positioning head to a different position in space and the stress by bending induced by the tilting movement are eliminated by the wobbler rotating about the main axis.

Figure 7:
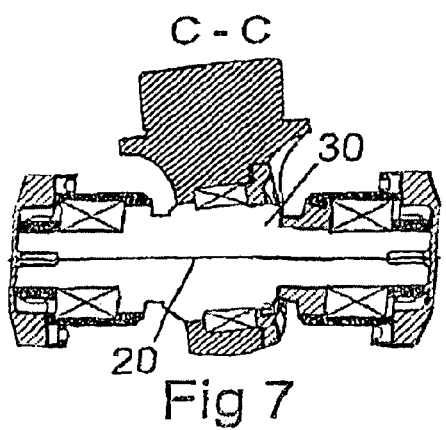
FIG. 7 is a sectional view of the main axis taken on the line C-C in FIG. 6.

FIG. 7 is a sectional view taken on the line C-C in FIG. 6. The tilting effect will be clearly apparent from FIG. 7, by virtue of the wobbler 30 having rotated around the main axis 20 relative to the position shown in FIG. 3.

For the sake of completeness, reference is made to FIG. 8, which is a side view illustrating the tilting position obtained when rotating the end 31 of the piston through an angle of 90° about the main axis in relation to the FIG. 6 illustration and tilted in a direction towards the joint mounting means 22.

FIG. 9 is a sectional view taken on the line D-D in FIG. 6 and shows a tilted state, wherein one side 92 of the piston end 31 is visible as opposed to the sectional view shown in FIG. 5. As a result of tilting which makes a rotation of the wobbler 30 about the main axis 20, the constant angle α between the main axis 20 and the wobbler axis 50 of the illustrated sections has decreased from about 12.5° in FIG. 5 to about 10.4° in FIG. 9. It will be appreciated that this change in angle is difficult to illustrate in the figures.

FIG. 10 illustrates a second embodiment of the present invention which, for clarity reasons, has been shown in mirror-image to the first embodiment shown in FIG. 2-9. FIG. 10 corresponds to the earlier described embodiment shown in FIG. 4, having a first joint mounting means 102 firmly mounted to the positioning head and a second joint mounting means 104 which is also firmly mounted to the positioning head. As described with reference to the first embodiment, the piston end 31 is mounted pivotally about a wobbler 106.

FIG. 11 is a sectional view taken on the line E-E in FIG. 10, from which it will be evident that the first joint mounting means 102 is comprised of a coupling housing that is intended to accommodate one end 113 of a supporting shaft 110. The supporting shaft 110 comprises an extension of the second joint mounting means 104, wherewith the other end 114 of the supporting shaft 110 is firmly connected to the positioning head. A clamp coupling 112 is provided within the joint mounting means 102 for radially fixating one end 113 of the supporting shaft 110. The wobbler 106 is rotatably mounted on the supporting shaft 110 with the aid of one or more needle bearings 116. In the case of this embodiment, the wobbler 106 is thus able to rotate around the supporting shaft 110 and therewith around the main axis 20, which defines the symmetry line of the fixed supporting shaft 110. As earlier described, the wobbler 106 includes a bearing mounting surface 34 or bearing surface around which the piston end 31 is mounted. The symmetry of the bearing mounting surface 34 or the bearing surface is defined by the wobbler axis 50, which defines a constant angle $\alpha$ with the main axis 20. A thrust bearing 118 is mounted on respective sides of the wobbler 106 and a spacer 119 is fitted on one side of the wobbler with the intention of facilitating angular settings and rotational movement.

Thus, this second embodiment of the invention has the same function as the earlier described first embodiment, i.e. tilting of the piston and its end 31 permits rotation of the wobbler 106.

FIG. 12 shows the second embodiment in a starting position, i.e. with an angle of 0° around the main axis 20, although with angular rotation of the piston 7 around the longitudinal axis of said piston, i.e. the same position as that shown in FIG. 2.

FIG. 13 is a sectional view taken on the line F-F in FIG. 12, wherewith the wobble axis 50 of the wobbler 106 coincides with the main axis 20 in this position. The figure corresponds to the earlier described FIG. 3.

Embodiments other than those described above are protected within the scope of the accompanying claims. This applies, for instance, to internal journaling of the supporting shaft in the first embodiment or a completely separate supporting shaft in relation to the joint mounting means in the case of the second embodiment.

The invention claimed is:

1. A parallel kinematic positioning machine having a frame and having an arm that is slidably mounted within a ring which is pivotably and rotatably mounted within the frame such that the arm can slide axially within the ring and swing in all directions relative to the frame, the positioning machine further comprising:
   a machine-connected positioning head mounted on an end of said arm;
   at least three machine-setting devices each mounted to the frame by a universal joint such that each of said machine-setting devices can swing in all directions relative to the frame, the universal joints being spaced around the frame circumferentially about said ring, each machine-setting device comprising a piston displaceable axially in a cylinder connected to the frame by a respective one of the universal joints, and each piston having an end pivotably connected by an arm joint to the positioning head;
   each arm joint comprising a wobbler comprising a supporting shaft having axially aligned ends defining a main axis and a centrally disposed offset cylindrical portion defining an external bearing mounting surface, said offset cylindrical portion having an axis having a constant angular offset from and intersecting with the main axis and defining a wobbler axis, said supporting shafts of the arm joints being mounted to the positioning head at positions tangential to a circumference of the positioning head concentrically around said end of said arm;
   said end of each piston being rotatably mounted to the external bearing mounting surface defined by the offset cylindrical portion of a respective one of said wobblers;
   wherein displacing the pistons in the respective cylinders rotates the offset cylindrical portion of each wobbler around the respective wobbler axis, tilting and displacing each supporting shaft relative to the respective one of said pistons, bringing the machine-connected positioning head to a different position in space relative to the frame.

2. A positioning machine according to claim 1, wherein the supporting shaft of each respective arm joint is rotatably mounted to the positioning head.

3. A positioning machine according to claim 2, wherein the supporting shaft of each respective arm joint is rotatably mounted to the positioning head by means of two bearing housings positioned on respective sides of the arm joint adapted to receive, respectively, a first said end and a second said end of the supporting shaft.

4. A positioning machine according to claim 1, wherein the supporting shaft of each respective arm joint is non-rotatably mounted to the positioning head and the offset cylindrical portion of the arm joint is rotatably mounted to the supporting shaft.

5. A positioning machine according to claim 4, wherein one of said ends of each respective supporting shaft is axially secured in a first joint mounting means on the positioning head by a clamp coupling; and wherein the other said end of the supporting shaft is firmly connected to a second joint mounting means on the positioning head.

6. A positioning machine according to claim 1, wherein, for each arm joint, the wobbler axis and the main axis of the respective supporting shaft mutually intersect at a constant angle $\alpha$, wherein $1° \leq \alpha \leq 45°$.

7. A positioning machine according to claim 1, wherein, for each arm joint, the wobbler axis and the main axis of the respective supporting shaft mutually intersect at a constant angle $\alpha$, wherein $5° \leq \alpha \leq 20°$.

8. A positioning machine according to claim 1, wherein each of the pistons intersect with the supporting shaft of each respective arm joint at an angle $\alpha$, so as to permit tilting between the pistons and the respective supporting shafts mounted to the positioning head.

* * * * *